United States Patent Office 3,316,264
Patented Apr. 25, 1967

3,316,264
2-PHENYLTHIO-4-ALKOXY-6-HALO-s-TRIAZINES
Frank Ross, Villa Park, and Sidney B. Richter, Chicago, Ill., assignors to Velsicol Chemical Corporation, Chicago, Ill., a corporation of Illinois
No Drawing. Filed Dec. 2, 1964, Ser. No. 415,463
4 Claims. (Cl. 260—248)

This is a continuation-in-part application of application Ser. No. 223,525, filed Sept. 13, 1962, now abandoned.

This invention relates to new pesticidal compositions of matter. More particularly, this invention relates to compounds having the structural formula

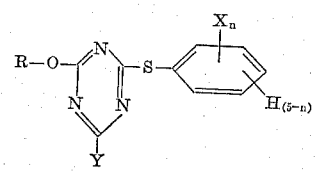

wherein R is an alkyl radical of 1 to 4 carbon atoms; Y is selected from the group consisting of chlorine and bromine; $n$ is a number from 1 to 5; and each X is independently selected from the group consisting of chlorine, bromine, nitro, amino, and alkyl, alkoxy, alkylthio and alkylamido radicals of 1 to 4 carbon atoms, provided that $n$ is a number from 2 to 5 when a minimum of one X is selected from the group consisting of chlorine, bromine, nitro, amino and alkyl radicals of 1 to 4 carbon atoms and provided that when $n$ is a minimum of 3, a maximum of two X's are selected from the group consisting of nitro, amino and alkyl, alkoxy, alkylthio and alkylamido radicals of 1 to 4 carbon atoms.

These chemical compounds have marked activity as fungicides useful for the control of undesirable fungus growths.

Generally, the new compounds described above, can be prepared, for example, by replacing two halogen atoms of the corresponding cyanuric halide with the desired substituents in a two step process. Cyanuric halides which are suitable as the starting material for the preparation of the compounds of this invention, are cyanuric chloride and cyanuric bromide. Thus, when Y is to be chlorine in the above structural formula representing the new compounds of this invention, cyanuric chloride is used as the starting material; while when Y is to be bromine, cyanuric bromide is used as the starting material.

As one example of the preparation of the compounds of this invention, in the first step, the cyanuric halide is reacted with a suitable alkanol to form the intermediate, 2-alkoxy-4,6-dihalo-1,3,5-triazine. Suitable alkanol reactants useful in the formation of the intermediate of the compounds of this invention are alkanols having 1 to 4 carbon atoms. The alkoxy residue of the alkanol selected will appear as the alkoxy substituent. Thus, for example, if the desired compound of this invention is to have a methoxy substituent in the 2-position, methyl alcohol is selected as the alkanol reactant. Similarly, to obtain the ethoxy, n-propoxy, iso-propoxy, n-butoxy, iso-butoxy, sec-butoxy, or tert-butoxy substituent in the 2-position, ethyl alcohol, n-propyl alcohol, iso-propyl alcohol, n-butyl alcohol, iso-butyl alcohol, sec-butyl alcohol, and tert-butyl alcohol, respectively is utilized as the alkanol reactant.

The alkoxy substituted triazine intermediate of the compounds of the present invention can be prepared by reacting cyanuric chloride or cyanuric bromide with an equimolecular or greater quantity of the alkanol reactant in the presence of a weak base, such as sodium bicarbonate, 2,4,6-trimethylpyridine, and the like. This reaction can be conveniently effected at normal room temperature for a period of about one-half hour so as to replace only one halogen atom of the cyanuric halide. The cyanuric halide is preferably dissolved in an excess of the alkanol reactant. The crude intermediate thus formed can often be used in the next step as such, or can be distilled in vacuo, or recrystallized from a suitable solvent to yield the relatively pure intermediate.

The new compounds of the present invention can readily be prepared, for example, in the second step by reacting the intermediate 2-alkoxy-4,6-dihalo-1,3,5-triazine, prepared as described above, with an equimolecular or greater quantity of a suitable substituted thiophenol in the presence of an equimolecular or greater quantity of a 2,6-disubstituted pyridine base or an alkali metal hydroxide. 2,4,6-trimethylpyridine is exemplary of a satisfactory 2,6-disubstituted pyridine base, while sodium hydroxide is an example of a suitable alkali metal hydroxide. A base is added to the reaction mixture to neutralize hydrogen chloride formed by the reaction.

The substituted thiophenol reactant selected determines the phenylthio-substituent of the new compound of this invention. For example, if the desired compound is 2-(2,4-dichlorophenylthio) - 4 - methoxy-6-chloro-1,3,5-triazine, which is represented by the above structural formula wherein R is methyl, Y and each X are chlorine, and $n$ is 2, the substituted thiophenol reactant selected for reaction with the corresponding intermediate, is 2,4-dichlorothiophenol. Similarly, to prepare a 2-(2,4-dimethylphenylthio)-4-alkoxy-6-halo-1,3,5 - triazine compound, m-4-thioxylenol is selected as the substituted thiophenol reactant. Illustrative of other suitable substituted thiophenol reactants are: 2,5- or 3,5-dichlorothiophenol, 2,3,4,6-tetra-chlorothiophenol, pentachlorothiophenol, 2,5-dibromothiophenol, 2-methyl-4-chlorothiophenol, 2-ethoxy-4 - chlorobenzenethiol, 2-methylthiobenzenethiol, 2,4-dinitro-thiophenol, 3-methoxy-p-toluenethiol, o-acetamido-thiophenol, and the like.

The suitable substituted thiophenol reactant often can be commercially obtained, or can readily be prepared by methods common to the art. For example, the substituted thiophenol reactants can be prepared by the reduction of the corresponding sulfonyl chloride with zinc and acetic acid, zinc and sulfuric acid, and the like. Aryl sulfinic acids similarly can be reduced to the corresponding substituted thiophenol. Aryl sulfonamides can be reduced to the corresponding substituted thiophenols by heating with concentrated hydriodic acid and phosphonium iodide. Also the substituted thiophenol reactants can be readily prepared from the corresponding substituted phenol by the action of phosphorus pentasulfide thereon.

The reaction of the substituted thiophenol reactant with the mono-alkoxy-dihalotriazine intermediate can be readily carried out by preferably dissolving the intermediate in an inert organic solvent, such as acetone, and mixing the intermediate with the substituted thiophenol reactant, preferably dissolved in the same or similar inert organic solvent. Reaction occurs when the base is added, with gentle heating or cooling, if required. Generally, the reaction proceeds readily at normal room temperatures, although temperatures up to about 60° C. can be used if necessary. The crude product formed by the reaction is separated from the by-product salt by filtration, and crystallized from solution by distilling off the solvent and cooling the concentrated solution. The crude product thus obtained can often be used as such, or can be recrystallized from a suitable solvent to yield the relatively pure compound.

The compounds of the present invention represented by the above structural formula wherein $n$ is a number from 1 to 5, and each X is independently selected from the group consisting of chlorine, bromine, nitro, and alkyl, alkoxy, thioalkyl, and alkylamino radicals of 1 to 4 carbon atoms, provided that $n$ is a number from 2 to 5 when a minimum of one X is selected from the group consisting of chlorine, bromine, nitro and alkyl radicals of 1 to 4 carbon atoms and provided that when $n$ is a minimum of 3, a maximum of two X's are selected from the group consisting of nitro and alkyl, alkoxy, alkylthio, and alkylamido radicals of 1 to 4 carbon atoms, can be readily prepared by the aforementioned procedure. Compounds of the present invention wherein $n$ is at least 2 and wherein at least one X is amino are preferably prepared from the corresponding compound wherein the said X is a nitro radical. It has been found more convenient to reduce the compound containing the nitro radical by means common to the art to an amino radical, than to attempt to utilize an amino-substituted thiophenol reactant in the previously described preparation. The reduction of the nitro-radical to an amino radical can be conveniently carried out by nascent hydrogen supplied by the action of tin on hydrochloric acid in the manner common to the art.

The compounds of the present invention having the previously described structural formula, and which are prepared by the procedure described above, are exemplified by:

2-(2,3,6-trichlorophenylthio)-4-methoxy-6-chloro-1,3,5-triazine,
2-(2,5-dichlorophenylthio)-4-methoxy-6-chloro-1,3,5-triazine,
2-(2,4-dinitrophenylthio)-4-iso-butoxy-6-bromo-1,3,5-triazine,
2-(2,4-diaminophenylthio)-4-ethoxy-6-chloro-1,3,5-triazine,
2-(3,5-dimethylphenylthio)-4-iso-propoxy-6-chloro-1,3,5-triazine,
2-(2,4-dimethylphenylthio)-4-methoxy-6-chloro-1,3,5-triazine,
2-(2,4,5-trichlorophenylthio)-4-sec-butoxy-6-chloro-1,3,5-triazine,
2-(pentachlorophenylthio)-4-ethoxy-6-chloro-1,3,5-triazine,
2-(3-amino-4-methylphenylthio)-4-methoxy-6-chloro-1,3,5-triazine,
2-(2,4-dimethylthiophenylthio)-4-methoxy-6-chloro-1,3,5-triazine,
2-(2,4-diacetamidophenylthio)-4-methoxy-6-chloro-1,3,5-triazine,
2-(2-methyl-4-nitrophenylthio)-4-methoxy-6-bromo-1,3,5-triazine,
2-(3-methyl-4-methoxyphenylthio)-4-methoxy-6-chloro-1,3,5-triazine,
2-(3-methyl-4-methylthiophenylthio)-4-ethoxy-6-bromo-1,3,5-triazine,
2-(3-methyl-4-chlorophenylthio)-4-methoxy-6-chloro-1,3,5-triazine,
2-(2,4-dibromo-5-methylphenylthio)-4-methoxy-6-bromo-1,3,5-triazine,
2-(2,4-dichloro-5-ethylphenylthio)-4-methoxy-6-chloro-1,3,5-triazine,
2-(2-methyl-4-acetamidophenylthio)-4-methoxy-6-chloro-1,3,5-triazine, and the like.

The manner in which the new compounds of this invention can be prepared is illustrated in the following examples:

EXAMPLE 1

*Preparation of 2-methoxy-4,6-dichloro-1,3,5-triazine*

A solution of cyanuric chloride (185 g.; 1 mol) in methyl alcohol (1.2 liters) was placed into a 2-liter three-necked, round-bottom flask equipped with mechanical stirrer, thermometer, and ice-water cooling bath. 2,4,6-trimethylpyridine (121.2 g.; 1 mol) was slowly added to the flask, while the contents of the flask were stirred. Although the reaction temperature initially rose to 35° C., it was thereafter maintained at 5°–10° C. The mixture was stirred for 2½ hours. The reaction solution was then diluted with water (3 liters) and the resulting yellow crystals of 2-methoxy-4,6-dichloro-1,3,5-triazine were separated therefrom by filtration, washed with water and dried by standing.

The intermediate 2-methoxy-4,6-dibromo-1,3,5-triazine is readily prepared by substituting cyanuric bromide for cyanuric chloride in the above example. Other 2-alkoxy-4,6-dihalo-1,3,5-triazine can readily be prepared by reacting a previously described alkanol reactant with cyanuric chloride or cyanuric bromide, as required, in a manner similar to Example 1, although in many cases it is preferable to utilize an inert organic solvent, such as dioxane, rather than a large excess of the alkanol reactant.

EXAMPLE 2

*Preparation of 2-(2,4-dichlorophenylthio)-4-ethoxy-6-chloro-1,3,5-triazine*

A solution of 2-ethoxy-4,6-dichloro-1,3,5-triazine (63 g.; 0.3 mol), prepared by the reaction of cyanuric chloride and ethyl alcohol by the procedure of Example 1, dissolved in acetone is placed into a 500 ml., three-necked, round-bottom flask equipped with a mechanical stirrer, reflux condenser, and dropping funnel. 2,4-dichlorothiophenol (53.7 g.; 0.3 mol) mixed with a small quantity of acetone is added to the flask. 2,4,6-trimethylpyridine (36.4 g.; 0.3 mol) is slowly added to the flask from the dropping funnel. The temperature of the reaction mixture is maintained at normal room temperature during the addition and for about two hours thereafter. The by-product salt precipitate is removed from the mixture by filtration, and the filtrate diluted with benzene-heptane mixture and cooled to release the crude product as a crystalline solid. The crude product can be used as such or can be purified by recrystallization from a suitable solvent, such as acetone.

EXAMPLE 3

*Preparation of 2-(4-acetamidophenylthio)-4-methoxy-6-chloro-1,3,5-triazine*

A cooled solution of 4-acetamidothiophenol (13.4 g.; 0.08 mol) and 2-methoxy-4,6-dichloro-1,3,5-triazine (14.8 g.; 0.08 mol); prepared as described in Example 1, in acetone (100 ml.) was placed into a 500 ml., three-necked, round-bottom flask fitted with a mechanical stirrer, dropping funnel, nitrogen inlet tube, and ice-water cooling bath. 2,4,6-trimethylpyridine (9.7 g.) in acetone (50 ml.) was added dropwise to the flask from the dropping funnel, while the mixture was stirred under a nitrogen atmosphere. After the addition was completed, the reaction mixture was warmed to room temperature and stirring was continued for 1.5 hours. The acetone was evaporated from the solution, and the residue dissolved in acetone and precipitated by addition of water. The precipitate was recrystallized several times from acetone and dried to yield the desired compound as a solid melting at 163° C.

EXAMPLE 4

*Preparation of 2-(2-methyl-4-chlorophenylthio)-4-methoxy-6-chloro-1,3,5-triazine*

A cooled solution of 2-methyl-4-chlorothiophenol (12.7 g.; 0.08 mol) and 2-methoxy-4,6-dichloro-1,3,5-triazine (14.8 g.; 0.08 mol) prepared as described in Example 1, in acetone (100 ml.) is placed into a 250 ml., three-necked, round-bottom flask fitted with a mechanical stirrer, dropping funnel and ice-water cooling bath. 2,4,6-trimethylpyridine (9.7 g.) in acetone (50 ml.) is added dropwise to the flask from the dropping funnel with stirring, while the mixture is cooled. After the addition is completed, the reaction mixture is warmed to room temperature and stirred for one hour. The reaction mixture is filtered, and the filtrate heated to evaporate acetone to yield a liquid residue which is extracted with diethyl ether. The ethereal solution is treated with dilute hydrochloric acid, washed with water, dried over anhydrous calcium chloride, filtered free of drying agent, and heated to evaporate diethyl ether, yielding the desired product as a residue. A sample of the crude product is crystallized from a mixture of diethyl ether and pentane and recrystallized successively from hexane, chloroform and acetone to yield the purified product as a solid.

EXAMPLE 5

Preparation of 2-(2-methyl-5-iso-propylphenylthio)-4-n-butoxy-6-chloro-1,3,5-triazine A solution of 2-n-butoxy-4,6-dichloro-1,3,5-triazine (62 g.; 0.3 mol), prepared by the reaction of cyanuric chloride and n-butyl alcohol by the modified procedure of Example 1, dissolved in acetone was reacted with thiocarvacrol (50 g.; 0.3 mol) in the presence of 2,4,6-trimethylpyridine by the procedure of Example 2. The reaction mixture was treated in the manner described therein to yield the product 2-(2-methyl-5-iso-propylphenylthio)-4-n-butoxy-6-chloro-1,3,5-triazine as a crystalline solid product.

Other compounds within the scope of the present invention having the aforesaid structural formula can be prepared in the manner detailed in the previous examples. Given in Examples 6 to 15 are the reactants which can be used with cyanuric chloride and cyanuric bromide to prepare the indicated named compounds of this invention. In these examples, cyanuric chloride is designated for brevity as CC. It should also be noted that cyanuric bromide can be utilized in place of cyanuric chloride to obtain the corresponding 6-bromo-triazine product.

EXAMPLE 6

CC+iso-propyl alcohol+2,4-dinitrothiophenol=2 - (2,4-dinitrophenylthio)-4-isopropoxy-6-chloro-1,3,5-triazine.

EXAMPLE 7

CC+methyl alcohol+2,4 - dimethoxythiophenol=2-(2,4-dimethoxyphenylthio) - 4 - methoxy-6-chloro-1,3,5-triazine.

EXAMPLE 8

CC+n-propyl alcohol+3-methoxy-p-toluene-thiol=2-(2-methoxy-4-methylphenylthio)-4-n-propoxy-6 - chloro-1,3,5-triazine.

EXAMPLE 9

CC+methyl alcohol+2,3,4,6-tetrachlorothiophenol=2-(2,3,4,6-tetrachlorophenylthio)-4-methoxy-6-chloro - 1,3,5-triazine.

EXAMPLE 10

CC+methyl alcohol+pentachlorothiophenol=2-(pentachlorophenylthio)-4-6-chloro-1,3,5-triazine.

EXAMPLE 11

CC+methyl alcohol+2,4-dibromothiophenol=2-(2,4-dibromophenylthio)-4-methoxy-6-chloro-1,3,5-triazine.

EXAMPLE 12

CC+methyl alcohol+2,4,5-trichlorothiophenol=2-(2,4,5-trichlorophenylthio) - 4 - methoxy-6-chloro-1,3,5-triazine.

EXAMPLE 13

CC+methyl alcohol+2,4,5-tribromothiophenol=2-(2,4,5 - tribromophenylthio)-4-methoxy-6-chloro-1,3,5-triazine.

EXAMPLE 14

CC+methyl alcohol+2,3,4,5-tetrabromothiophenol=2-(2,3,4,5 - tetrabromophenylthio)-4-methoxy-6-chloro-1,3,5-triazine.

EXAMPLE 15

CC+methyl alcohol+pentabromothiophenol=2-pentabromophenylthio-4-methoxy-6-chloro-1,3,5-triazine.

The following example is illustrative of the preparation of the compounds of the present invention wherein $n$ is at least 2 and at least one X is an amino radical. Although a specific 2-(nitrophenylthio)-4-alkxoy-6-halo-1,3,5-triazine is utilized in the example, it should be noted that any other compound of this invention wherein $n$ is at least 2 and at least one X is a nitro radical may be substituted in its place to obtain the corresponding amino-substituted compound.

EXAMPLE 16

Preparation of 2-(2,4-diaminophenylthio)-4-iso-propoxy-6-chloro-1,3,5-triazine An excess of iron filings is slowly added to the product of Example 6 (40 g.) suspended in hot water (400 ml.) acidified with concentrated hydrochloric acid (5 ml.). The mixture is shaken continually during the addition and cold water is added to the mixture as needed to moderate the reaction temperature. When heat no longer evolves, the mixture is gently heated and sodium carbonate (10 g.) is added. The mixture is filtered while hot and the filtrate cooled and extracted with anhydrous diethyl ether. The ether extract is dried over anhydrous magnesium sulfate, which is then removed by filtration. The ether is removed by distillation in vacuo on a steam bath to yield the desired product as the residue.

For practical use as pesticides, the compounds of this invention are generally incorporated into pesticidal compositions which comprise an inert carrier and a pesticidally toxic amount of such a compound. Such pesticidal compositions, which are usually known in the art as formulations, enable the active compound to be applied conveniently to the site of the pest infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid pesticidal compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the pest infestation. The emulsifiers most commonly used in these concentrates are nonionic or mixtures of nonionic with anionic surface-active agents.

A typical pesticidal composition according to this invention is illustrated by the following example, in which the quantities are in parts by weight.

EXAMPLE 17

Preparation of a dust

Product of Example 2 _____ 10
Powdered talc _____ 90

The above ingredients are mixed in a mechanical grinder-blender and are ground until a homogeneous, free-flowing dust of the desired particle size is obtained. This dust is suitable for direct application to the site of the pest infestation.

The pesticides of this invention can be applied in any manner recognized by the art. The concentration of the new compounds of this invention in the pesticidal compositions will vary greatly with the type of formulation and the purpose for which it is designed, but generally the pesticidal compositions will comprise from about 0.05 to about 95 percent by weight of the active compounds of this invention. In a preferred embodiment of this invention, the pesticidal compositions will comprise from about 5 to about 75 percent by weight of the active compound. The compositions can also comprise such additional substances as other pesticides, spreaders, adhesives, stickers, fertilizers, activators, synergists, and the like.

The new compounds of this invention are fungicidal in their ability to kill, inhibit or inactivate a fungus so that it does not grow. Practically, these compounds can be used to prevent fungi and molds from harming cloth, wood, plants, animals, or whatever else they attack. The fungicidal compound should preferably be applied before the infection has occurred and certainly before it has progressed very far.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber, cereal leaf rust on wheat, and such common soil fungi as fusarium wilt (*Fusarium oxysporum*), the seed rot fungus *Phythium debaranum*, and the sheath and culm blight *Rhizoctonia solani*. The new compounds of this invention can also be employed as industrial fungicides to control a variety of fungi which attack such materials as adhesives, cork, paints, lacquers, leather, wood, plastics, and textiles such as cotton and wool.

The quantity of active compound of this invention to be used for good disease control will depend on a variety of factors, such as the particular disease involved, the intensity of the infestation, formulation, weather, type of crop and the like. Thus, while the application of only one or two ounces of active compound per acre of a crop may be sufficient to control a light infestation of certain fungi, a pound or more of active compound per acre may be required to control a heavy infestation of a hardy species of fungus.

The utility of the compounds of this invention was illustrated, for example, by experiments carried out for the control of fungi.

In a typical experiment, 30 mg. samples of the compound to be tested were each dissolved in acetone (10 ml.), containing sorbitan trioleate (0.2% by weight) and polyoxyethylene sorbitan trioleate (0.5% by weight) as surface active agents. Each acetone mixture was then dispersed in distilled water (90 ml.) to form test solutions containing 300 p.p.m. active compound.

Susceptible species of tomato plants, growing in soil in individual paper pots were sprayed with the above test solution when grown to a height of approximately 6–8 inches. Three replicates were used for each treatment. After the spray had dried thoroughly, the plants were sprayed with a suspension of spores of tomato late blight fungus, *Phytophthora infestans*, which had been reared on lima bean agar. After a few days to one week, disease symptoms were observed and rated by comparison to controls treated with acetone.

Experiments were also carried out for control of cereal leaf rust. In these experiments, susceptible species of Lucas wheat were grown in soil in paper pots with 20–30 plants per pot. The plants were sprayed with the above test solutions when the plants were 6 to 8 inches tall. Three pots were used for each treatment. After the spray had dried thoroughly, the plants were sprayed with a suspension of spores of wheat leaf rust disease, *Puccinia recondita*, physiologic race 122, reared on wheat plants. After ten days, disease symptoms were observed and rated by comparison to controls treated with acetone.

The results of these experiments demonstrate the high degree of fungicidal activity possessed by the compounds of the present invention.

We claim:
1. A compound of the formula

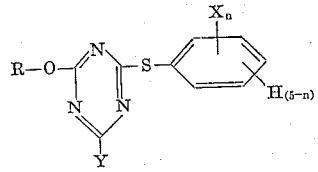

wherein R is an alkyl radical of 1 to 4 carbon atoms; Y is selected from the group consisting of chlorine and bromine; $n$ is a number from 1 to 5; and each X is independently selected from the group consisting of chlorine, bromine, nitro, amino, and alkyl, alkoxy, alkylthio, and alkylamido radicals of 1 to 4 carbon atoms, provided that at least one X is selected from the group consisting of alkoxy, alkylthio and alkylamido radicals of 1–4 carbon atoms, and provided that when $n$ is a minimum of 3, a maximum of two X's are selected from the group consisting of nitro, amino and alkyl, alkoxy, alkylthio and alkylamido radicals of 1 to 4 carbon atoms.

2. A compound of claim 1 wherein X is an alkylthio radical of 1 to 4 carbon atoms.

3. A compound of claim 1 wherein X is an alkylamido radical of 1 to 4 carbon atoms.

4. 2 - (4 - acetamidophenylthio) - 4 - methoxy - 6-chloro-1,3,5-triazine.

References Cited by the Examiner

UNITED STATES PATENTS 2,911,337  11/1959  Uhlenbroek et al. ---- 260—248

FOREIGN PATENTS 204,559  7/1959  Austria.
872,313  7/1961  Great Britain.

WALTER A. MODANCE, *Primary Examiner.*

JOHN M. FORD, *Assistant Examiner.*